(12) United States Patent
Shintani et al.

(10) Patent No.: US 6,922,386 B2
(45) Date of Patent: Jul. 26, 2005

(54) OPTICAL DISK APPARATUS

(75) Inventors: Toshimichi Shintani, Kodaira (JP); Harukazu Miyamoto, Higashimurayama (JP); Takeshi Maeda, Kokubunji (JP); Takeshi Shimano, Tokorozawa (JP); Takahiro Kurokawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 71 days.

(21) Appl. No.: 10/713,265

(22) Filed: Nov. 17, 2003

(65) Prior Publication Data

US 2004/0105372 A1 Jun. 3, 2004

(30) Foreign Application Priority Data

Nov. 19, 2002 (JP) .................................. 2002-334478

(51) Int. Cl.[7] ................................................. G11B 7/00
(52) U.S. Cl. ............................. 369/112.01; 369/53.26; 369/112.02; 369/112.05
(58) Field of Search .................. 369/47.5, 47.51, 369/53.26, 112.01, 112.02, 112.03, 112.05, 116, 124.03

(56) References Cited

U.S. PATENT DOCUMENTS

| | | | | |
|---|---|---|---|---|
| 4,656,618 A | * | 4/1987 | Kaku et al. ............ | 369/112.05 |
| 4,841,514 A | * | 6/1989 | Tsuboi et al. ............... | 369/100 |
| 4,980,879 A | * | 12/1990 | Yamada et al. ............. | 369/100 |
| 5,043,960 A | * | 8/1991 | Nakao et al. ............ | 369/13.02 |
| 5,130,958 A | * | 7/1992 | Fukami et al. ........... | 369/13.25 |
| 5,267,226 A | * | 11/1993 | Matsuoka et al. ........ | 369/44.11 |
| 5,278,813 A | * | 1/1994 | Ohnishi et al. .......... | 369/44.14 |
| 5,351,225 A | * | 9/1994 | Ishida et al. ............. | 369/44.32 |

FOREIGN PATENT DOCUMENTS

| | | |
|---|---|---|
| JP | 60-185232 | 3/1984 |
| JP | 1-184631 | 1/1988 |
| JP | 2-27525 | 7/1988 |

OTHER PUBLICATIONS

Horie, Michikazu et als., "Materials Characterization and Application of Eutectic Sb Te Based Phase–Change Optical Recording Media", Proc. of SPIE vol. 4342, 2002, PP. 76–87.

* cited by examiner

*Primary Examiner*—Paul W. Huber
(74) *Attorney, Agent, or Firm*—Reed Smith LLP; Stanley P. Fisher, Esq.; Juan Carlos A. Marquez, Esq.

(57) ABSTRACT

Light emitted from a laser is divided into two light waves so that the ratio of the power of one light wave to the power of the other will be appropriate. The resultant light waves are irradiated to the same track on a medium. The preceding spot is used for erasure, and modulated so that the same pattern as the one formed with a recording pulse will be formed. The high-power component of the modulated light of the erasing spot causes the temperature of a recording layer to be equal to or higher than the melting point. The medium-power component of the modulated light forms a crystallizing temperature area on the recording layer. A liquid crystal diffraction grating is used to divide power, and a power division ratio is variable and controllable.

9 Claims, 11 Drawing Sheets

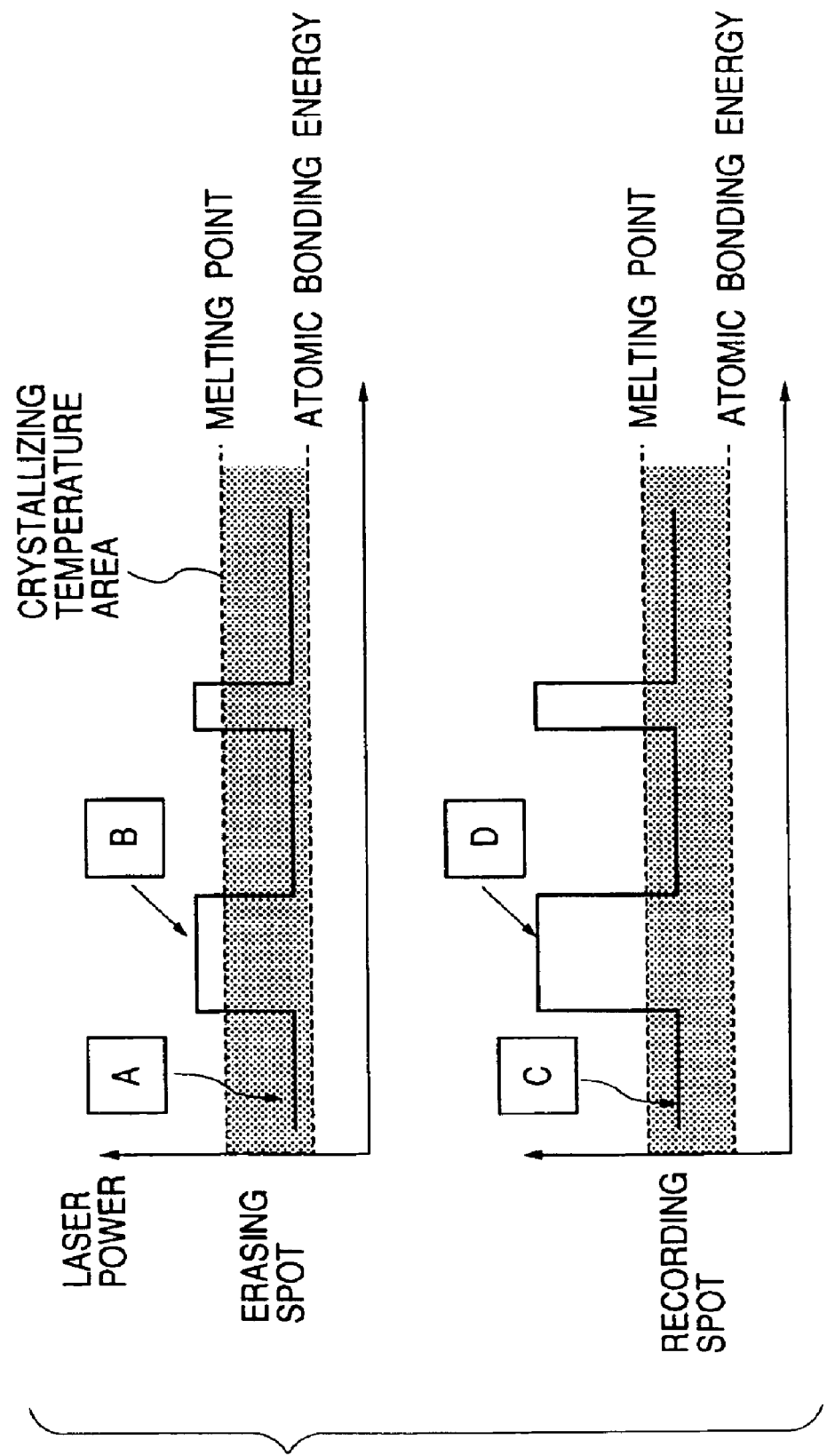

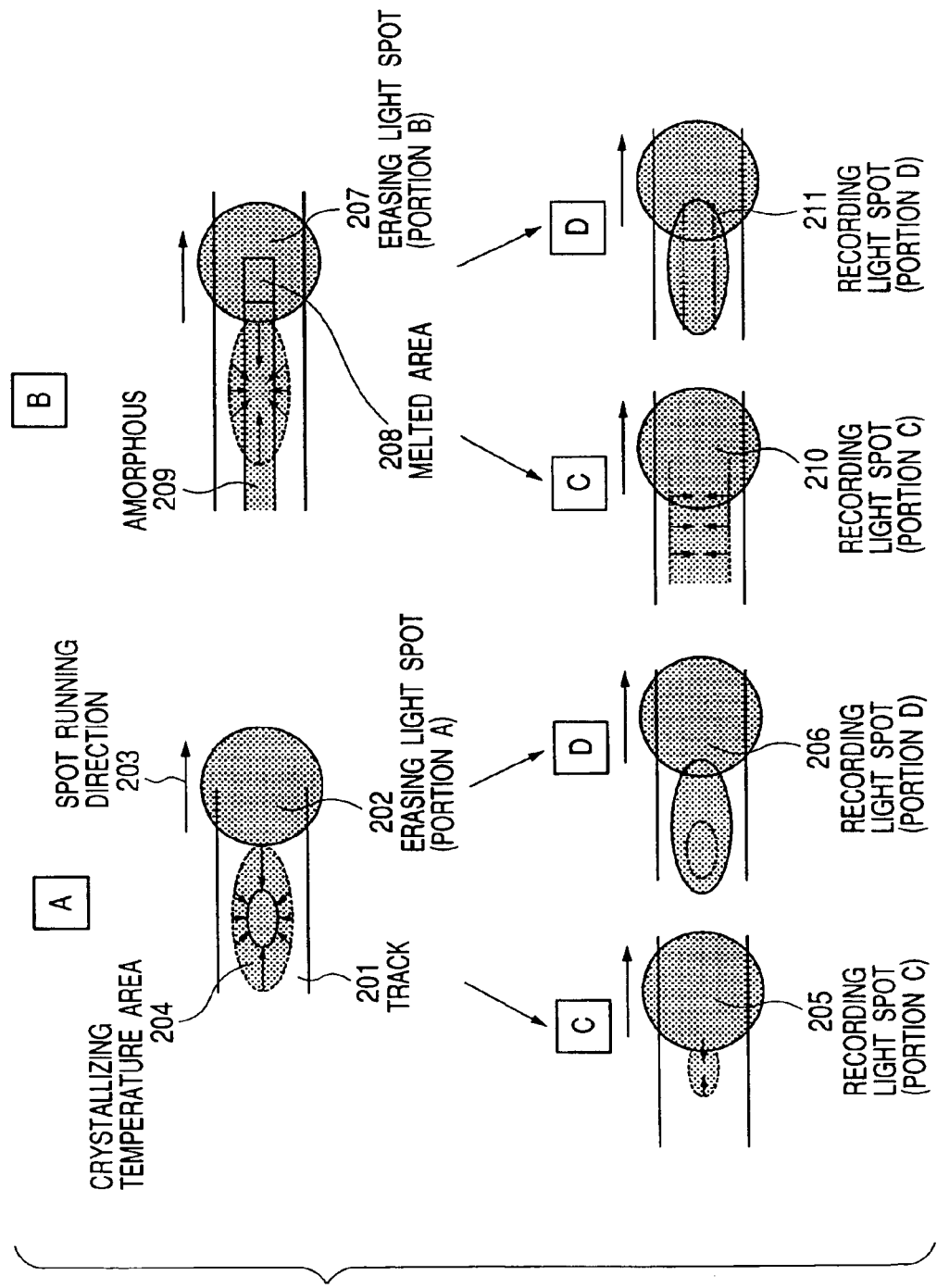

FIG. 3C
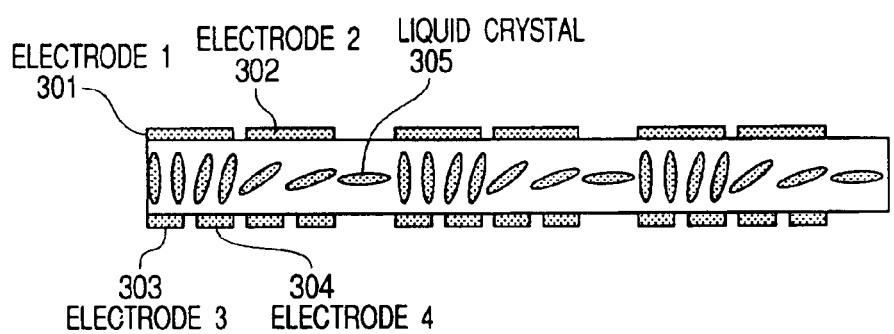
FIG. 3D  FIG. 3E
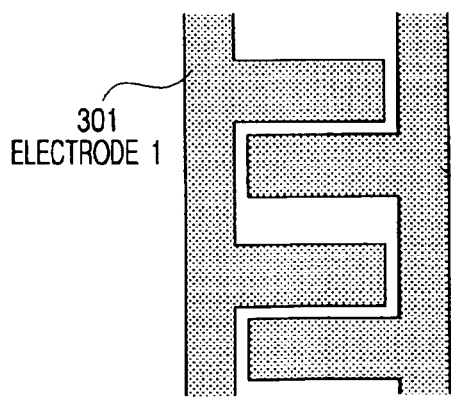 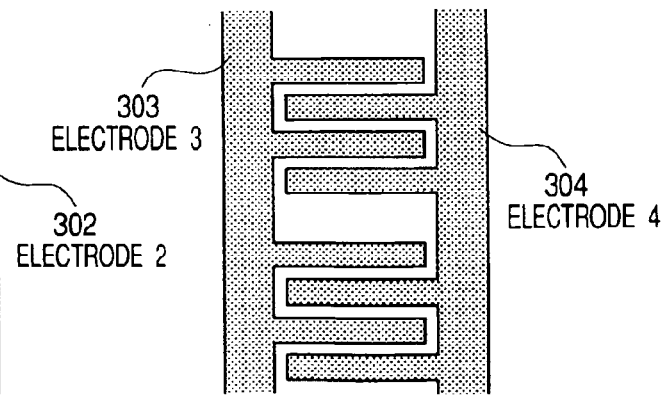

OPTICAL DISK APPARATUS

FIELD OF THE INVENTION

The present invention relates to an optical information recording apparatus that records and/or reproduces information using light, or more particularly, to an optical disk apparatus.

BACKGROUND OF THE INVENTION

Problems underlying the field of optical disks include (1) realization of a high density and (2) realization of a high speed. As for the realization of a high speed, for example, a storage system included in a large-capacity server system is replaced with an optical disk drive, high-speed recording is requested. Moreover, high-speed recording is desired in case where data is downloaded over the Internet.

On the other hand, at present, a phase change optical disk such as a DVD-RAM is widely adopted as a rewritable optical disk. According to the phase change disk technology, data is recorded by extending control so that the molecular structure of a recording layer will be changed between crystalline and amorphous states. The recording method will be described below. Namely, laser light whose power is demodulated is irradiated to initialized crystal. The laser pulse is composed of recording power, bottom power, and erase power. Consequently, recrystallization deriving from recording is prevented. New data is recorded while a mark that has already been recorded before irradiation of laser powers is being erased. This method is called direct overwriting.

When data is recorded or overwritten on a rewritable medium at a high speed, an amorphous mark must be erased at an equivalent high linear velocity. Therefore, the speed of crystallization must be raised. "Optical Data Storage 2001" (p. 76–87, 2001) carried by the Proceedings of SPIE Vol. 4342 describes an example in which an optical system including a light source that emits laser light whose wavelength is 405 nm and an objective whose numerical aperture (NA) is 0.85 are used to perform high-speed recording equivalent to recording at 120 Mbps. Herein, a material produced by adding Ge and Sb to a eutectic composition of Sb70Te30 is used to produce a recording layer. Herein, Sb is characteristic of a high speed of crystallization. The larger an Sb content, the higher the speed of crystallization of the recording layer. This enables high-speed overwriting.

The above example employs a unique pattern according to which laser light is emitted for recording. In normal phase change recording, as shown in FIG. 4A, laser light to be used for recording is modulated into high-level power (recording power Pw), medium-level power (erase power Pe), and low-level power (bottom power Pb). The sum of the durations of the recording power Pw and erase power Pb contained in one laser pulse is set to 1 Tw (where Tw denotes a window width). The laser pulse is repeatedly irradiated according to the pattern in order to record data. Therefore, a recording pulse is composed of laser pulses and called a multi-pulse. According to this method, a mark whose length corresponds to nTw (where n denotes a positive integer) is recorded using (n-1) or (n-2) multi-pulses. In the case of a DVD-RAM on which the shortest mark whose length corresponds to 3 Tw is recorded, the mark of 3 Tw long is recorded using one pulse, and the mark of nTw long is recorded using (n-2) multi-pulses. Moreover, when the length of the shortest mark corresponds to 2 Tw, the mark of 2 Tw long is recorded using one pulse, and the mark of nTw long is recorded using (n-1) multi-pulses. On the other hand, a semiconductor laser is adopted as a light source for an optical disk apparatus, the rise or fall time of laser light has a finite value and is typically about 2 ns. A pulse whose duration is equal to or shorter than 4 ns assumes a triangular wave as shown in FIG. 4B. The laser power does not reach the Pw level, and the energy applied to the recording layer is insufficient. Consequently, a mark is not recorded successfully. This leads to degraded quality of recorded marks. According to the aforesaid literature, the duration of a multi-pulse is set to 2 Tw as shown in FIG. 4C. The power of a laser pulse is raised to the recording power level Pw in order to record a mark.

If the speed of crystallization of a medium cannot be raised, direct overwriting is hard to do. In this case, a method of performing erasure twice is adopted as described in Japanese Patent Laid-Open Nos. S60(1985)-185232, H1(1989)-184631, and H2(1990)-027525. The Japanese Patent Laid-Open No. S60(1985)-185232 describes an information reproducing apparatus in which: two lasers capable of being driven independently of each other emit light waves that are polarized in different directions; a beam splitter separates the two laser light waves from each other; and one of the two laser light waves is used for recording or reproduction and the other is used for erasure. The Japanese Patent Laid-Open No. H1(1989)-184631 describes that: existing information is erased (during the first turn of a disk) by homogenizing a recording layer with the energy of a single light spot given during the first irradiation; and information is recorded (during the second turn of the disk) by alternating the power of energy given during the second irradiation between a high power level and a medium power level. Moreover, the Japanese Patent Laid-Open No. H2(1990)-027525 describes that existing information is overwritten with new information while being erased during the first irradiation, and the new information is verified with a carrier-to-noise (C/N) ratio improved during the second irradiation.

According to a method referred to as a two-spots technique, light waves emitted from two mutually-independent lasers are irradiated to different positions on the same track on a medium. One of the light waves is used for erasure, and the other is used for recording or reproduction. Thus, erasure is performed reliably. The preceding spot of laser light is irradiated by applying, for example, a DC voltage, and used for erasure. The succeeding spot of laser light is modulated similarly to the recording power of a laser pulse used for normal phase change recording. The preceding spot melts a recording layer or may change the state of the recording layer into the amorphous state. In other words, a homogeneous amorphous band is formed on the track. This operation shall be called DC writing because data is recorded by forming an amorphous band with application of a DC voltage. When the recording layer is melted, an amorphous mark formed past is fully erased. When a recording spot having recording power Pw, intermediate power Pe that crystallizes the recording layer, and bottom power Pb passes through the amorphous band that results from DC writing, a mark is brought to an amorphous state and a space is brought to a crystalline state with the intermediate power Pe. Consequently, the same record pattern as the one produced by performing normal phase change recording is formed.

When the speed of crystallization of the recording layer is raised, the speed of crystallization remains high even in a place where the temperature is low or a room temperature. An amorphous mark formed for recording data is crystallized due to heat dissipated at the room temperature or heat dissipated from a medium that absorbs the reproducing light power Pr, whereby the mark disappears. In other words, the durability of reproducing light is degraded or the life of stored data is shortened. FIG. 5 indicates the results of measurement of a time t (−1 dB) required until the carrier level of light forming a mark decreases by 1 dB with the reproducing light power Pr set to 0.3 mW. Herein, a recording layer shall be made of GeSbTe, and an optical system employed emits laser light whose wavelength is 405 nm and includes an objective whose numerical aperture is 0.85. FIG. 5 graphically indicates a Sb content as a function of the time t. The measuring method is such that the reproducing light power Pr is set to a range from 0.5 mW to 0.7 mW, and the relationship between the elapsed time t and the decrease DV in the amplitude of light is measured. This measurement is performed with the reproducing light power Pr set to several power levels.

On the analogy of formula (1) concerning the reaction kinetics, $$v = v0 \exp(-Ea/kT) \qquad (1)$$

where v denotes a reaction rate, Ea denotes activation energy, k denotes a Boltzmann's constant, and T denotes temperature, formula (2) is drawn out.

$$DV = A \exp[-B/(Pr\,t)] \qquad (2)$$

where A and B denote a constant.

A and B in the formula (2) are worked out from the relationship between the measured time t and the amplitude decrease DV. Consequently, the time t (−1 dB) required until the amplitude decrease DV diminishes by 1 dB with the power Pr set to 0.3 mW is calculated. Laser light exhibits a Gaussian distribution, and heat moves time-sequentially. The temperature T and power Pr are not always proportional to each other. Herein, a discussion will proceed on the assumption that the temperature T and power Pr are approximately proportional to each other. As seen from FIG. 5, when the Sb content increases, the durability of reproducing light is degraded rapidly. In particular, when the atomic percentage of the Sb content is 86, the durability is degraded in several sec.

Based on the data of FIG. 5, the life of stored data is estimated on the assumption that a disk is placed at the room temperature. When reproducing light is irradiated to the disk, the temperature of the recording layer of the disk rises to about 100° C. For brevity's sake, a model described below is adopted. Namely, the diameter of the spot of reproducing light shall be approximately 0.45 $\mu$m. When the light spot passes through a point on the disk, the temperature at the point shall reach 100° C. During the other time, the temperature shall be low enough and crystallization shall not take place. The durability of the reproducing light is, as seen from the formula (1), determined with the exponential function of temperature. When the room temperature is 25° C. and the Sb content of the disk is 80%, the time required until the amplitude of the reproducing light decreases by 1 dB at the room temperature is one year or less. Therefore, when one year elapses, a mark formed for recording data is rapidly crystallized. Consequently, it becomes impossible to reproduce recorded data.

When the Sb content comes to about 80%, rewriting causes marked degradation. FIG. 6 indicates the relationship between the number of times of rewriting and the degree of modulation of light in a case where the light is irradiated to a disk, which has a recording layer whose Sb content is 80%, at a linear velocity of 1.5 m/s in order to form a mark so as to record data. When the number of times of rewriting is equal to or larger than 10, the degree of modulation is degraded. When the number of times of rewriting is 200, no mark is formed. In this state, when the linear velocity of the disk is raised and recording is performed, a phase-change mark is slightly formed. This implies that rewriting causes the speed of crystallization to change. This phenomenon is thought to attribute to the fact that Sb separates its phase from the phases of the other constituents of a recording layer. When the Sb content of GeSbTe is approximately 70%, the composition of GeSbTe is close to a eutectic composition and is therefore stable. If Sb is further added, GeSbTe having the eutectic composition and Sb which are stable may be separated from each other. This is because when the GeSbTe and Sb are separated from each other, they are thermodynamically stable. Consequently, rewriting causes a crystallization characteristic to change. The method of raising the speed of crystallization by increasing an Sb content confronts limitations when it is adopted as a method of raising a recording speed.

Furthermore, it is hard to control high-speed recording. The example in which the duration of a multi-pulse is set to 2 Tw has been described in relation to the related art. In this case, it is impossible to make the number of pulses constituting a multi-pulse, which is used to form a mark of 3 Tw long, different by one pulse from the number of pulses constituting a multi-pulse that is used to form a mark of 4 Tw long. This is because when the number of recording pulses constituting a multi-pulse that is used to form a mark of 4 Tw long is decreased by one, the resultant number of recording pulses creates the same pattern as the recording pulses constituting a multi-pulse that is used to a mark of 2 Tw long. The pattern created by the recording pulses that are used to form a mark of nTw long must be defined differently between when n denotes an even number and when n denotes an odd number. When the recording speed is further raised, Tw becomes equal to or smaller than 2 ns. In this case, the duration of a multi-pulse must be, for example, about 4 Tw. The number of recording pulses must be discussed more carefully. Besides, since the duration of the multi-pulse is longer than 2 Tw, when a format defining that the shortest mark length is 2 Tw is adopted, it is very hard to control recording of a mark having a length of 2 Tw. Moreover, according to the related art, the degradation in the quality of a recording pulse is, as indicated in FIG. 4C, avoided by adopting a pulse whose duration is 2 Tw. When the power of laser light rises or falls, crystallization of a recording layer is facilitated. Consequently, recrystallization occurring during recording to be achieved by forming a mark is intensified, and jitter is worsened.

According to the conventional two-spots technique, one optical disk drive requires two lasers, optical elements for the lasers, and control circuits that are associated with the respective lasers and used to align the optical elements. This leads to an increase in the cost of the optical disk drive. Moreover, since the number of parts or circuits increases, it becomes hard to design an optical head compactly. The invention disclosed in the Japanese Patent Laid-Open No. S60 (1985)-185232 employs an array of semiconductor lasers capable of being mutually independently driven. Laser light waves are polarized on different planes, whereby a disk drive is designed compactly. However, according to the invention, unless the planes of polarization on which the light waves emitted from two semiconductor lasers meet exactly at 90°, the spot of one laser light is invaded by the power of the other laser light. The two spots are no longer independent of each other. The requirements for the planes of polarization of the two laser light waves depend on the properties of a disk. Depending on the requirements, the array of semiconductor lasers serving as a light source becomes very expensive. Moreover, according to the invention, the two laser light waves are passed through different objectives and irradiated to a disk. Auto-focusing servo systems and tracking servo systems must be formed in association with the respective light waves. Consequently, two laser drivers and two servomechanisms are needed. This leads to an expensive disk drive. The Japanese Patent Laid-Open Nos. H1(1989)-194631 and H2(1990)-27525 have revealed the method that laser light is irradiated to the same track twice. The first irradiation of laser light is used for erasure, and the second irradiation of laser light is used for recording. This is intended to improve the ratio of erasure efficiency to recording efficiency. However, the method requires twice more time for recording and cannot meet the need for high-speed recording.

SUMMARY OF THE INVENTION

In order to solve the foregoing problems, the present invention provides an optical disk recording apparatus in which laser light that is emitted from a light source and polarized in the same direction is divided into two light waves. One of the light waves is used to shoot an erasing spot, and the other is used to shoot a recording spot. The two light waves have the first power that causes the temperature of a recording layer to be equal to or higher than the melting point, and the second power that forms a crystallizing temperature area or that causes the temperature of the recording layer to be equal to or higher than the temperature of the atomic bond energy and fall below the melting point, respectively.

FIG. 1A and FIG. 1B are explanatory diagrams concerning the present invention. Referring to FIG. 1A, linearly polarized light emanating from a laser 101 is passed through a collimator lens 102, and divided into two light waves at an appropriate power division ratio by means of a laser beam dividing mechanism 103. The two laser light waves are circularly polarized by a quarter-wave plate 105, and routed to a disk 108 via a mirror 106 and an objective lens 107 respectively. At this time, the two laser light waves are, as shown in FIG. 1B, irradiated to the same track on the disk 108. Light waves reflected from the disk 108 reversely trace the foregoing path. The reflected light waves are then linearly polarized by the quarter-wave plate 105 so that they will have the planes of polarization that are 90° different from the planes of polarization on which the light waves are emitted from the laser. The light waves have their paths bent by a polarized light splitter 104, and routed to each of photo-detectors included in an auto-focusing servo system, a tracking servo system, and a reproduced signal processing system.

FIG. 1B shows the positional relationship between the laser light waves on the disk 108. The two light spots are a recording spot 110 and an erasing spot 111 which propagate in an advancing direction 112 along the same track 109. The erasing spot 111 precedes the recording spot 110. On the track, an old recorded mark 113 with which data is already been recorded exists. A discussion will be made on the assumption that the old recorded mark will be overwritten with a new recorded mark 116.

The disk 108 is rotating at a certain linear velocity. In this state, a mark is formed on the disk 108. The linear velocity shall be higher than the speed of crystallization of the recording layer of the disk 108. When the erasing spot 111 passes the old recorded mark, the mark has only a portion 114 thereof in FIG. 1B crystallized. An unerased portion 115 is thought to take place. This problem will be solved by controlling a power dividing ratio that is observed by the laser beam dividing mechanism 103.

FIG. 2 indicates power modulation of the spots and the mechanism of overwriting. The spots are shot by dividing light, which is emitted from the same laser 101, at a predetermined power dividing ratio using the laser beam dividing mechanism 103. As shown in FIG. 2A, the spots are modulated in terms of the powers thereof left so that they will draw the same pattern expressing the different powers. At this time, the powers of the erasing spot are determined so that the medium power portion A of the shot erasing spot will form a crystallizing temperature area in which crystallization of the recording layer is facilitated, or will cause the temperature of the recording layer to be equal to or higher than the temperature of the atomic bond energy but fall below the melting point. Moreover, the high power portion B of the erasing spot causes the temperature of the recording layer to be equal to or higher than the melting point. Moreover, the powers of the recording spot are determined so that the medium power portion C of the recording spot will form the crystallizing temperature area on the recording layer, and that the high power portion D thereof will cause the temperature of the recording layer to be equal to or higher than the melting point. A recording pulse shown in FIG. 2A is not a multi-pulse like the one shown in FIG. 4A to FIG. 4C. This point will be described later.

Both the erasing and recording spots are modulated so that they will form the same pattern. Since the spots are, as shown in FIG. 1B, irradiated to different places, as far as a certain point on the disk is concerned, the respective spots are, as shown in FIG. 2B, shot with different powers, and destined to confront the following four cases:

(1) A→C: The portion A 202 of the erasing spot sweeps in a spot-advancing direction 203. Only a portion of a mark corresponding to the crystallizing temperature area 204 is crystallized, and an unerased mark portion is left. However, the portion C 205 of the next recording light spot facilitates crystallization. Consequently, the unerased mark portion is erased.

(2) A→D: Similarly to (1), an unerased mark portion is left. However, since the portion D 206 of a recording spot passes through the unerased mark portion, the unerased mark portion is erased. Moreover, a mark is recorded.

(3) B→C: The portion B 207 of a erasing light spot sweeps while melting the center of the spot and its vicinity. In this case, the center of a mark is melted, and heat is conducted towards the edges of the track. The mark is therefore fully erased. However, since the linear velocity is higher than the speed of crystallization, before a melted area 208 is recrystallized, the spot 207 passes through the area. Consequently, the temperature of the melted area 208 decreases. An amorphous band 209 therefore results from DC writing. However, thereafter, the portion C 210 of the recording spot passes through the amorphous band 209. Consequently, the amorphous band 209 is crystallized.

(4) B→D: Similarly to (3), the amorphous band 209 is formed. However, the portion D 211 of the recording spot forms a mark on the amorphous band 209. The amorphous band 209 is erased.

In the above four cases, a mark is fully deleted and can be overwritten. Moreover, if the above process is executed with a power division ratio set appropriately, the area of an unerased mark portion and that of an amorphous band become nearly identical to each other. This state is nearly identical to a state in which the recording layer is brought to an amorphous state with one application of a DC voltage. If the foregoing method is adopted, the same advantage as the one provided when erasure and recording are performed with two respective times of irradiation of laser light can be provided with one time of irradiation of laser light.

An optimal division ratio at which laser light should be divided depends on the crystallization characteristic of a medium and the sensitivity of light for recording.

Due to the foregoing mechanism, the power division ratio between the erasing and recording spots must be determined so that the power of the erasing spot will be lower. This is because the width of an amorphous band caused by the power of the portion B shown in FIG. 2A is preferably smaller than that of an amorphous mark formed with the power of the recording spot portion D. If the amorphous band caused by the power of the portion B has a larger width than the formed amorphous mark, the amorphous band cannot be erased with the power of the portion C.

Next, the laser beam dividing mechanism 103 will be described below. In order to divide laser light, the employment of a diffraction grating is easy to do. In this case, if a normal diffraction grating is employed, first-order diffraction occurs symmetrically to a main light wave. Therefore, at least three light waves are produced.

As shown in FIG. 3A, if a laterally asymmetrical diffraction grating is employed, two light waves are produced. The distance between the two light waves can be controlled by adjusting the pitch between adjoining ones of grooves included in the diffraction grating. The power division ratio can be controlled by adjusting the width of each groove and the pitch. Assume that the width of each groove of the diffraction grating is a, the pitch between adjoining grooves is d, the number of grooves is N, the wavelength of light is λ, an x coordinate of a view point (therein the position of a track on a disk) is X, and the distance between the diffraction grating and a plane of view (herein the disk) is R. In this case, the intensity I (X) of light diffracted at the position X can be written as well-known formula (3) below.

$$I(X) = Au^2U^2 = A\left(\frac{\sin \pi d v_x}{\pi d v_x}\right)^2 \left(\frac{\sin \pi a N v_x}{\sin \pi a v_x}\right)^2 \quad (3)$$

$$v_x = \frac{X}{\lambda R}$$

where A denotes a constant.

In the formula (3), the functions u and U oscillates along with the value X, and their behaviors depend on the values a and d. Light at the position X=0 shall be called zero-order diffracted light, and light of the second highest intensity shall be called first-order diffracted light. According to the formula (3), the intensities of the zero-order diffracted light and first-order diffracted light can be controlled by adjusting the values a and d. Second-order and higher-order diffracted light waves also exist. However, compared with the intensities of the zero-order and first-order diffracted light waves, the intensities of the second-order and higher-order diffracted light waves are very low. The second-order and higher-order diffracted light waves are therefore negligible.

FIG. 3A shows a saw-toothed diffraction grating. The employment of a stepped diffraction grating like the one shown in FIG. 3B, which resembles the saw-toothed diffraction grating, provides the same advantage. This is described in, for example, the "Principles of Optics" written by Born and Wolf (6th edition, p. 407–412, 1980).

Furthermore, as shown in FIG. 3C, a liquid crystal diffraction grating can be employed. An example of an optical disk apparatus in which the liquid crystal diffraction grating is employed is reported in "Optical Data Storage 2001" (p. 22–25, 2001) carried in the Proceedings of SPIE Vol. 4342. According to the reported method, the phase of the center portion of laser light and the phase of the marginal portion thereof are adjusted using the liquid crystal diffraction grating. Thus, a degree of spherical aberration deriving from the unevenness in the thickness of a substrate is corrected. In this case, the alignment of liquid crystalline molecules is controlled with a voltage. Only when polarized light whose direction agrees with the direction in which the liquid crystalline molecules are aligned falls on the liquid crystal diffraction grating, the liquid crystal diffraction grating offers an effective refractive index and can change the phases.

According to the present invention, a liquid crystal diffraction grating in which liquid crystalline molecules are aligned continuously or stepwise and cyclically is employed. This kind of liquid crystal diffraction grating is realized with a structure having liquid crystalline molecules 305 sandwiched among electrodes 301 to 304 shown in FIG. 3C. The alignment of the liquid crystalline molecules is determined with voltages developed at the upper and lower electrodes shown in FIG. 3C. When no voltage is applied to the electrodes 301 to 304, the liquid crystalline molecules are not aligned lengthwise in the drawing. Light therefore is not diffracted but travels rectilinearly. Assume that voltages are applied to the respective electrodes so that the liquid crystalline molecules will be aligned as shown in FIG. 3C. If laser light that is linearly polarized lengthwise in the drawing falls on the liquid crystal diffraction grating, the effective refractive index offered by the liquid crystal diffraction grating changes only in a place where liquid crystal is oriented lengthwise. The refractive index remains unchanged in a place where no voltage is applied, and the liquid crystal diffraction grating provides the same advantage as an ordinary diffraction grating so as to produce diffracted light.

The alignment of liquid crystalline molecules is realized according to a method described below. For example, a voltage of 5 V is applied to the electrode 301, a voltage of 1 V is applied to the electrode 302, a voltage of –3 V is applied to the electrode 303, and a voltage of –1 V is applied to the electrode 304. In this case, a voltage applied to the liquid crystalline molecules varies depending on between what electrodes the liquid crystalline molecules are sandwiched.

Namely, (1) 8 V is applied to the liquid crystalline molecules sandwiched between the electrodes 301 and 303. (2) 6 V is applied to the liquid crystalline molecules sandwiched between the electrodes 301 and 304. (3) 4 V is applied to the liquid crystalline molecules sandwiched between the electrodes 302 and 303. (4) 2 V is applied to the liquid crystalline molecules sandwiched between the electrodes 302 and 304. (5) 0 V is applied to the liquid crystalline molecules that are not sandwiched between any electrodes.

As mentioned above, a voltage can be spatially modulated stepwise, and the liquid crystalline molecules can be cyclically aligned as shown in FIG. 3C. Furthermore, for example, if the voltages to be applied to the electrodes are reduced, force exerted in aligning the liquid crystalline molecules lengthwise is weakened. Consequently, the lengthwise change in the effective refractive index diminishes, and the diffraction efficiency deteriorates. The powers of light waves resulting from division are therefore low. Thus, the power ratio between the two light waves, that is, the ratio of the power of one of the light waves to the power of the other can be controlled by adjusting the voltages to be applied to the electrodes.

The electrodes 301 to 304 are realized when produced as shown in, for example, FIG. 3D and FIG. 3E. These drawings are top view of parts of electrodes. The electrodes are produced vertically cyclically in the drawings. When the electrodes are produced as illustrated, mutually independent voltages can be readily applied to the respective electrodes.

When the liquid crystal diffraction grating is employed, a recommended recording power level and a recommended power division ratio are recorded on a medium in advance at the factory before delivery of the medium. When the medium is inserted into a disk drive, the data is read so that the power division ratio will be adopted. Otherwise, when the medium is inserted into the disk drive, or before data is recorded, certain part of a disk is used to perform a recording test with the recording power level, erasing power level, and power division ratio set as parameter values.

For example, the parameter values causing the condition that overwriting jitter should be minimized to be satisfied may be discovered and designated. Otherwise, both of the above two methods may be adopted. In this case, the recommended power division ratio may be varied within a range from +20% to −20% in order to discover a power division ratio that causes the condition that the overwriting jitter should be minimized to be satisfied. The recommended power division ratio depends on the properties of a disk. For example, when a disk whose nearly optimal power division ratio is 3:2 is employed, the nearly optimal power division ratio is discovered within a range from 15:8 to 6:5.

The present invention can be adapted to a case where the linear velocity is higher than the speed of crystallization. This means that recrystallization deriving from recording can be prevented. Consequently, unlike the conventional multi-pulse recording technique, a high-quality mark can be formed with a single recording pulse. Since a single recording pulse is employed, the configuration of a laser driver system is simplified. Furthermore, the degradation in quality of a recorded mark attributable to the rise and fall times of laser light which is described in conjunction with FIG. 4C can be avoided. For this reason, the recording pulse shown in FIG. 2A is realized with a single pulse. As shown in FIG. 4A to FIG. 4C, when the power of the recording pulse is lowered to the bottom power level, the power of a preceding erasing pulse or spot also decreases to the bottom power level. Nevertheless, the aforesaid mechanism that copes with cases (1) to (4) is established under proper conditions. This is because heat dissipated with application of power preceding or succeeding erasure conducts during erasure. The conditions are optimized by controlling a power division ratio to be observed by the laser beam dividing mechanism 103.

When recording can be achieved using a single pulse, the length of a recording pulse relative to the length of a mark can be adjusted in an analog manner. This makes it easy to control recording. Moreover, since the bottom power is unnecessary, a laser driver included in a disk drive can be simplified. Moreover, since recrystallization is suppressed, recrystallization occurring at the leading or trailing edge of laser light diminishes. Recording can be achieved independently of the quality of laser light. This leads to an improved yield on manufacture of a disk drive. Consequently, the disk drive can be produced at a low cost.

When data is recorded on a certain disk at several different linear velocities, if a recording strategy, a recording power level, and a power division ratio between two spots are optimized relative to each linear velocity, overwriting can be achieved at the different linear velocities. Namely, when the aforesaid liquid crystal diffraction grating is employed, data on the same disk can be overwritten at different linear velocities. Consequently, constant-angular velocity (CAV) recording can be achieved on a conventional disk having a simple structure.

What has been described so far is concerned with a case where two spots are used for recording and erasure respectively. Now, a description will be made of a case where two spots are used for reproduction. A noise contained in a reproduced signal falls into an amplifier noise, a laser noise, and a medium noise. Among them, the amplifier noise and laser noise are so-called white noises that are little dependent on a frequency. Assuming that a noise contained in a signal includes white noises alone, since the white noises are random noises, when signals reproduced at two different times are added up, the resultant white noises are equivalent to a square root of the original ones. However, the number of signal components is doubled. Consequently, a signal-to-noise ratio becomes a square root.

When signals produced independently using two spots shot according to the present invention are added up, the above advantage can be provided. In this case, since the positions of the two spots on a disk are different from each other, the timings of the signals must be matched before the signals are added up. This is achieved by delaying a signal, which is acquired using a preceding erasing spot, by a time calculated as a quotient of the distance between two spots by the linear velocity of the disk. Otherwise, the timings of signals are calculated using a clock pattern written on the disk, and then matched accordingly. Moreover, when this method is adopted, the power division ratio between two light waves to be used for reproduction should be preferably set to 1:1.

The noise contained in a reproduced signal actually includes a medium noise. The medium noise is not a white noise but is a signal component dependent on a place. Therefore, when two reproduced signals are added up, the resultant medium noise is equivalent to a double of the one included in the noise contained in the reproduced signal. The signal-to-noise ratio ensured by the method implemented in the present invention is smaller than the one equivalent to a square root. Nevertheless, the method improves a signal-to-noise ratio.

According to the present invention, data on a rewritable phase change disk can be overwritten at a high speed on the assumption that the linear velocity is higher than the speed of crystallization. The present invention provides an inexpensive disk drive that can overwrite data at a super high speed according to a simple recording strategy while ensuring the durability of reproducing light, the life of stored data, and a certain number of times of rewriting. Moreover, since the adverse effect of the rise and fall times of laser light on recording is minimized, a yield of a disk drive improves. The present invention permits constant-angular velocity (CAV) recording to be performed on a phase change disk having a conventional simple structure. Moreover, by adding up signals acquired independently using two spots, a signal-to-noise ratio can be improved. Furthermore, initialization of a disk that precedes recording can be omitted.

BRIEF DESCRIPTION OF THE DRAWINGS

FIG. 1A is an explanatory diagram of an optical system;

FIG. 1B is an explanatory diagram concerning the positions of light spots on a medium;

FIG. 2A and FIG. 2B are explanatory diagrams concerning actions of a laser and a physical change in a recording layer;

FIG. 2A is an explanatory diagram concerning modulation of laser light spots;

FIG. 2B is an explanatory diagram concerning a change in a recording layer occurring when laser light waves shown in FIG. 2A are irradiated;

FIG. 3A to FIG. 3E show examples of a laser beam dividing mechanism employed in the present invention;

FIG. 3A shows a saw-toothed diffraction grating;

FIG. 3B shows a stepped diffraction grating;

FIG. 3C shows a liquid crystal diffraction grating;

FIG. 3D is a top view of electrodes 301 and 302 shown in FIG. 3C;

FIG. 3E is a top view of electrodes 303 and 304 shown in FIG. 3C;

FIG. 4A indicates an example adapted to a case where a linear velocity is low;

FIG. 4B indicates an example adapted to a case where a linear velocity is high;

FIG. 4C indicates an example adapted to a case where the sum of the times during which recording power and bottom power are given corresponds to 2 Tw;

FIG. 7A is an explanatory diagram showing an optical head;

FIG. 7B shows the structure of a disk;

DETAILED DESCRIPTION OF THE PREFERRED EMBODIMENTS

First Embodiment

Figure 7A:
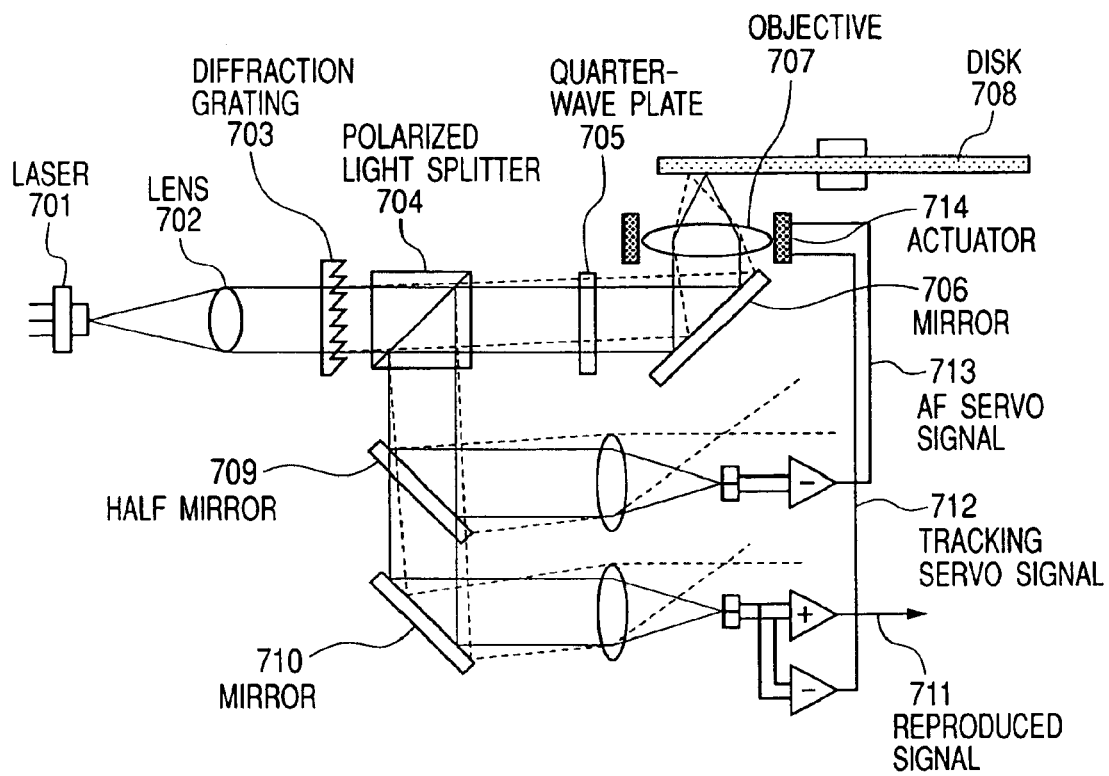
FIG. 7A and FIG. 7B are explanatory diagrams concerning a first embodiment of the present invention.

A first embodiment of the present invention will be described below. FIG. 7A is an explanatory diagram concerning a disk drive in accordance with the first embodiment. A laser that emits violet laser light whose wavelength is 400 nm is adopted as a laser 701. Linearly polarized laser light emitted from the laser 701 is recomposed into parallel rays by a collimator lens 702, and then divided into two light waves by a stepped diffraction grating 703 shaped like the one shown in FIG. 3B. Herein, the stepped diffraction grating 703 is realized with a diffraction grating that divides light into recording light and erasing light at the power division ratio of 3:2. At this time, the distance between the two light waves on a disk is 10 µm. Laser light is circularly polarized by a quarter-wave plate 705, and routed to a disk 708 by way of a mirror 706 and an objective 707 respectively. Herein, the numerical aperture of the objective 707 is set to 0.85. Light reflected from the disk 708 is linearly polarized by the quarter-wave plate 705 so that it will have a plane of polarization which is 90° different from the one of the incident light. The resultant light has the path thereof bent by a polarized light splitter 704. The laser light is then divided into two light waves by a half mirror 709, whereby one light wave falls on photo-detector for the auto-focusing servo. The other light wave is reflected from a mirror 710, and then transmitted as a reproduced signal and routed to a photo-detector for the tracking servo. A signal 713 detected by the auto-focus photo-detector and a tracking servo signal 712 are transmitted to an actuator 714 and used to control the position of the objective.

Figure 7B:
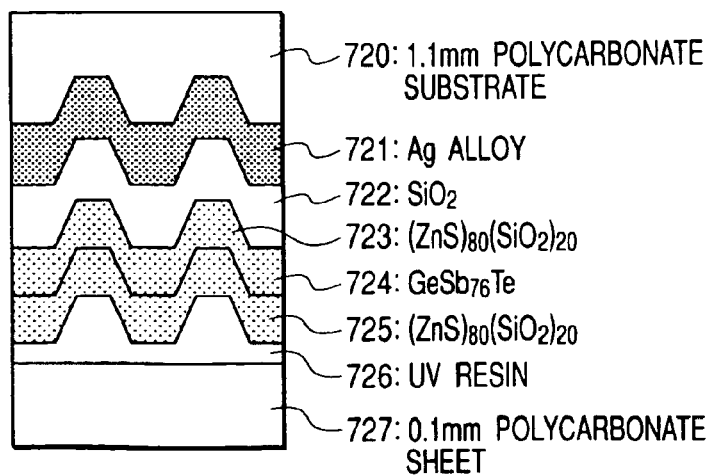

FIG. 7B shows the structure of the employed disk. A substrate 720 is formed with a polycarbonate substrate having a thickness of 1.1 mm, and has grooves, of which depth is approximately 20 nm, formed therein so that the pitch between adjoining tracks will be 0.32 µm. Through sputtering, the substrate 720 is coated with an Ag alloy 721 serving as a reflective layer, a protective layer $SiO_2$ 722, a protective layer $(ZnS)_{80}(SiO_2)_{20}$ 723, a recording layer GeSbTe 724, and a protective layer $(ZnS)_{80}(SiO_2)_{20}$ 725. A polycarbonate sheet 727 of 0.1 mm thick is bonded to the Ag alloy 721 using an ultraviolet resin 276. The thickness of the ultraviolet resin is 2±1 µm. Moreover, the Sb content of the recording layer is 76%.

Marks are formed on the disk in order to record data. The conditions for recording other than a linear velocity are identical to the conditions for recording of 25 GB described in "Optical Data Storage 2001" (p. 168–177, 2001) carried in the Proceedings of SPIE 4342. Namely, the shortest mark is 2 Tw long, the longest mark is 8 Tw long, and the length of the 2 Tw mark is 0.149 µm. Assuming that the ratio of all data on the disk to user data (data efficiency) is approximately 82%, the disk having a diameter of 120 mm offers a storage capacity of 25 GB.

The above literature describes that the linear velocity of the disk is 4.92 m/s and a data transfer rate is 36 Mbps. For recording, the linear velocity is set to 49.2 m/s that is ten times higher than 4.92 m/s. However, the linear velocity of the disk is set to 4.92 m/s for reproduction.

When data on the disk was overwritten according to the conventional method, a jitter value reached 7.1% at the linear velocity of 20 m/s. When the linear velocity was equal to or higher than 20 m/s, part of a mark remained unerased. Although an initial jitter value could be measured, jitter occurring after the completion of overwriting could not be measured.

Thereafter, data on a disk was experimentally overwritten according to the method implemented in the present invention. A recording pulse was not a multi-pulse but a single pulse. A pulse to be applied in order to form a mark of nTw long (where n denotes a positive integer) had a duration of (n-0.5)Tw. The bottom power was unemployed. The recording power Pw of the recording pulse was set to 6 mW, and the erasing power Pe thereof was set to 2.4 mW. The power division ratio between a recording spot and a erasing spot was set to 3:2 because 3:2 is found optimal through measurement of a disk performed in advance. The high power level of the erasing spot was set to approximately 4.0 mW, and the medium power level thereof was set to 1.6 mW.

Recording was performed under the above conditions. A jitter value measured during initial recording was 6.2%. The jitter value measured after ten times of overwriting was 6.8%, that measured after one hundred times of overwriting was 6.7%, and that measured after five thousand times of overwriting was 7.9%. Consequently, a recording speed of 360 Mbps is feasible.

Second Embodiment

Figure 1A:
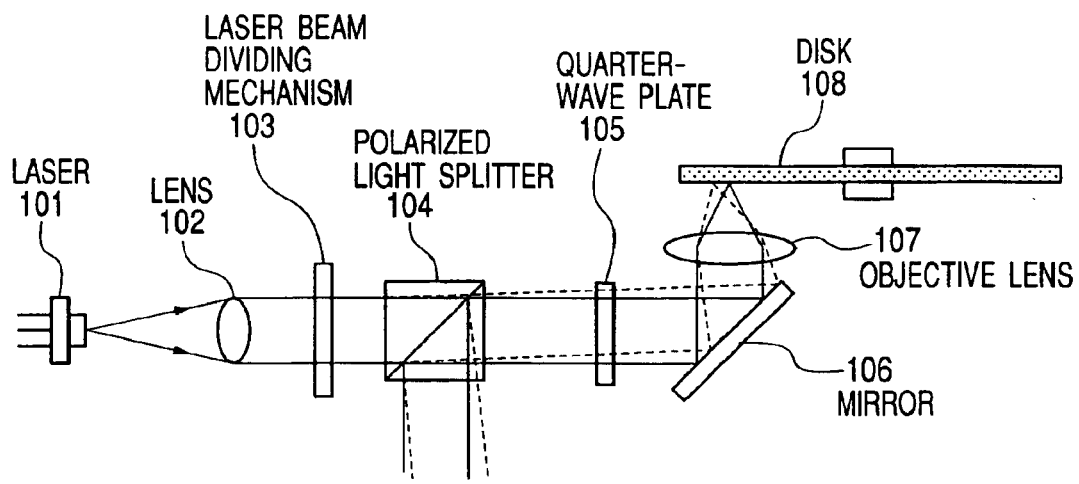
FIG. 1A and FIG. 1B are explanatory diagrams of the present invention.
Figure 1B:
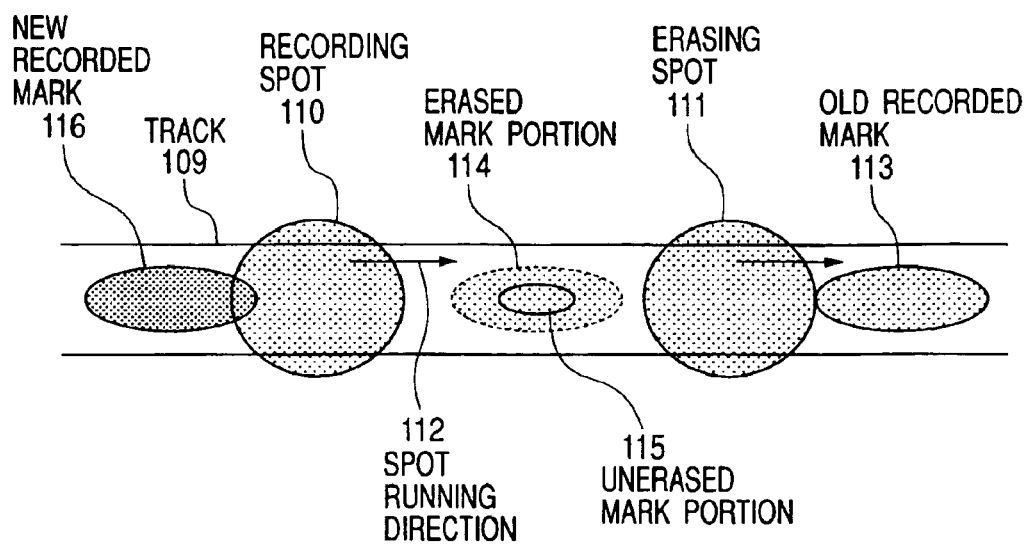
Figure 3A:
Figure 3B:
Figure 4A:
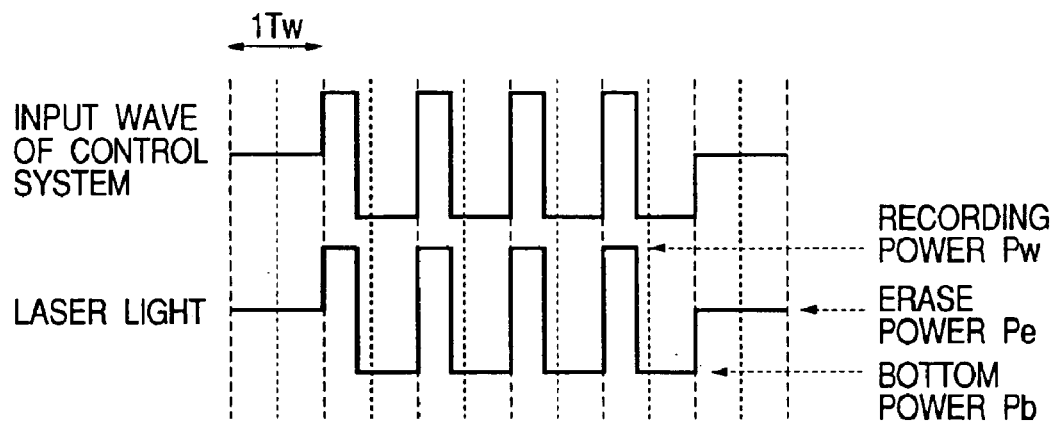
FIG. 4A to FIG. 4C indicate examples of a recording strategy for phase change recording employed in a related art.
Figure 4B:
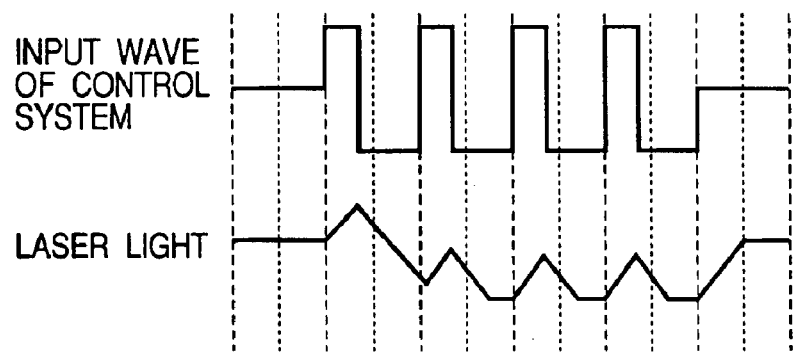
Figure 4C:
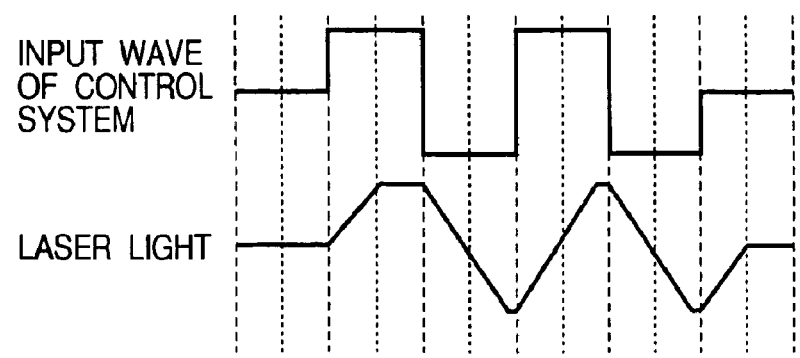
Figure 5:
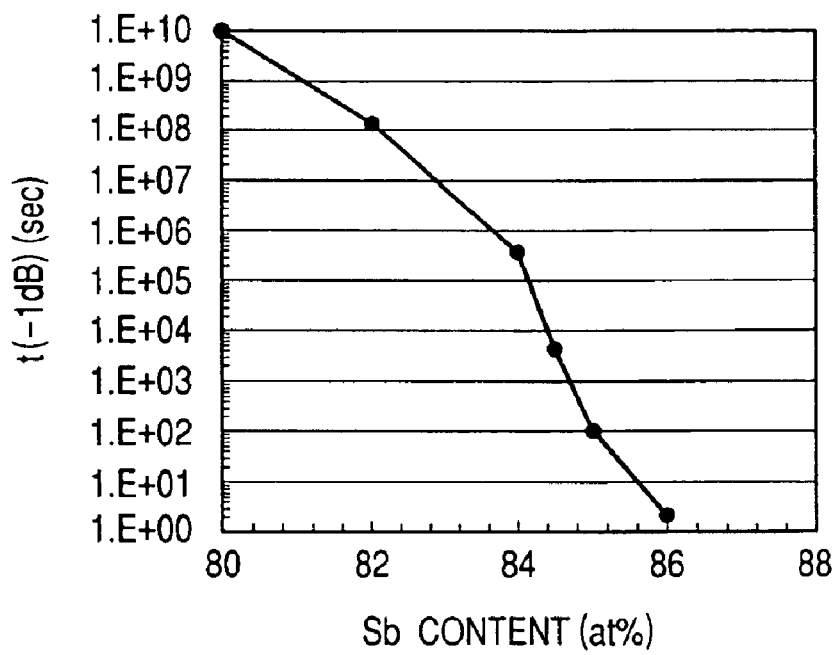
FIG. 5 indicates the relationship between an Sb content of a phase change recording layer suitable for high-speed recording and the durability of reproducing light, wherein the axis of abscissas indicates the Sb content and the axis of ordinates indicates the time required until the carrier level of light forming a mark decreases by 1 dB.
Figure 6:
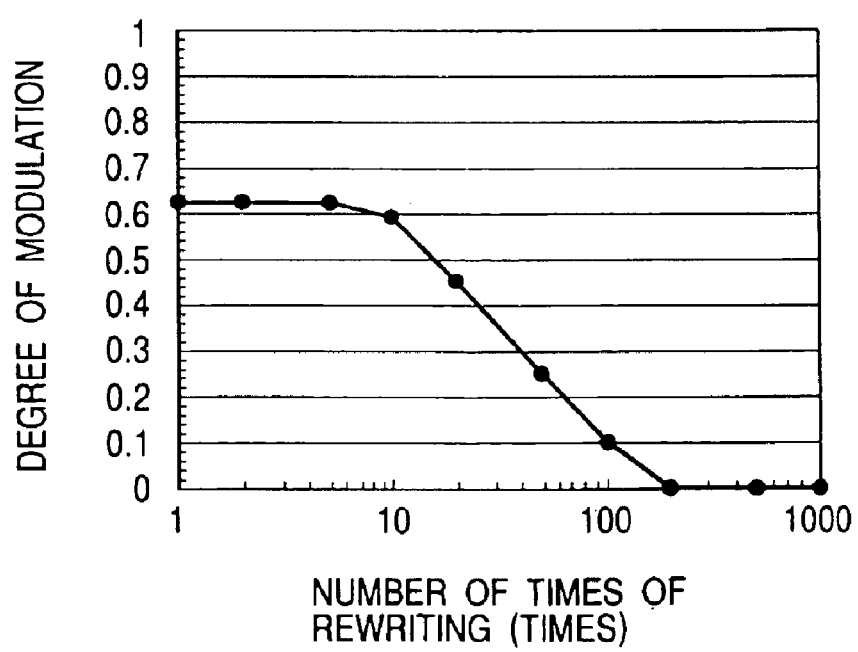
FIG. 6 indicates the dependency of a degree of modulation on the number of times of rewriting detected when data on a disk having a recording layer whose Sb content is 80% is overwritten using a mark.
Figure 8:
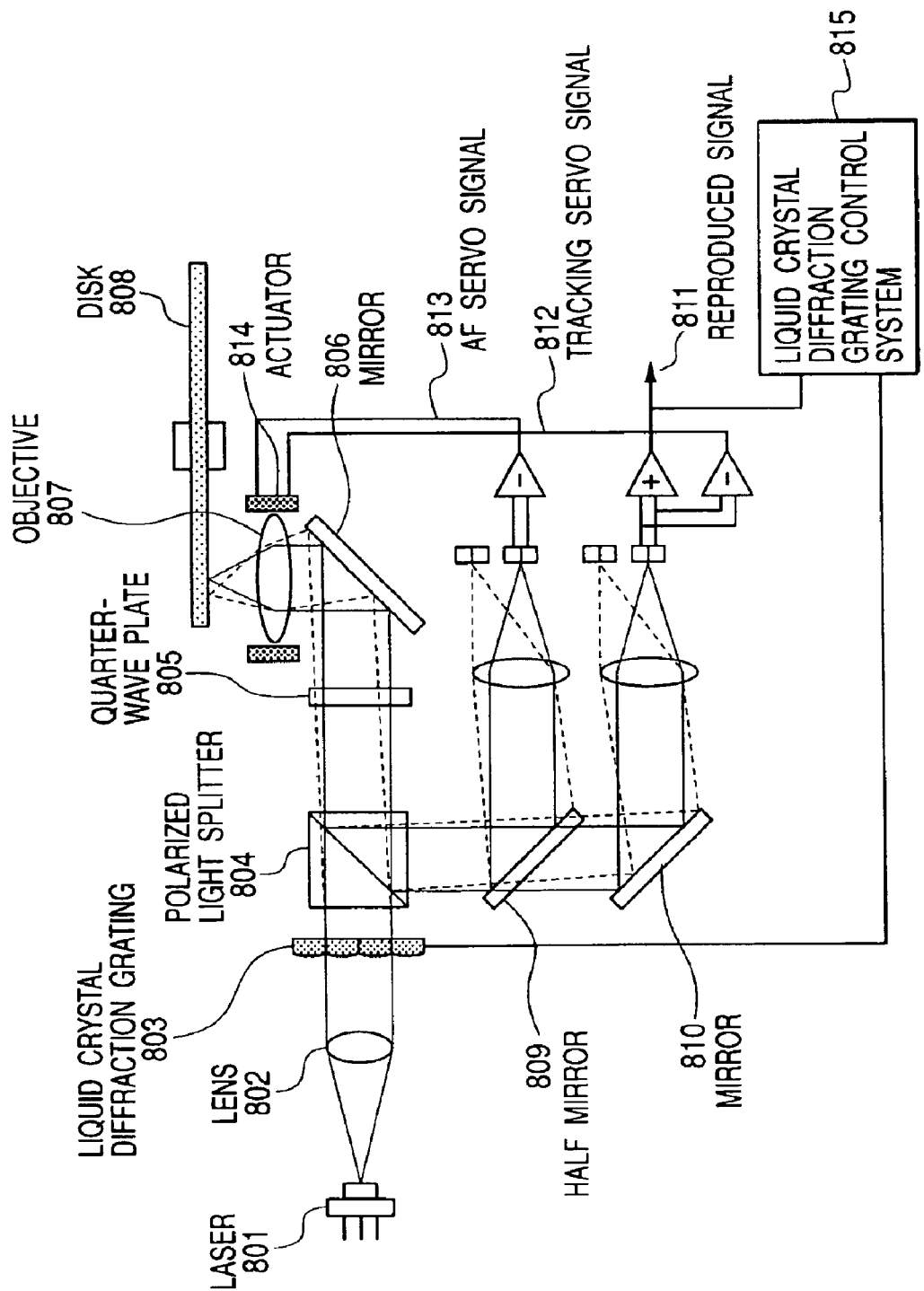
FIG. 8 is an explanatory diagram showing an optical head employed in a second embodiment of the present invention.

FIG. 8 is an explanatory diagram concerning a second embodiment of the present invention. Differences from the first embodiment lie in a point that a liquid crystal diffraction grating 803 described in conjunction with FIG. 3C is substituted for the diffraction grating 703, and a point that a reproduced signal is transferred to a liquid crystal diffraction grating control system 815 in order to control voltages to be applied to the liquid crystal diffraction grating. As far as a disk drive in accordance with the present embodiment is concerned, after a disk is inserted, when the disk drive recognizes that the disk is a rewritable disk, a recording test is performed. Specifically, data is recorded on a predetermined portion of a disk with voltages to be applied to the liquid crystal diffraction grating, a recording power level, and an erasing power level varied. Based on the results of the recording-test, the aforesaid parameters are set to values that permit minimization of overwriting jitter.

The disk and the conditions for recording and reproduction were identical to those employed in the first embodiment. A jitter value measured during initial recording was 6.2%. The jitter value measured after ten times of overwriting was 6.2%, that-measured after one hundred times of overwriting was 6.2%, that measured after one thousand times of overwriting was 6.5%, and that measured after five thousand times of overwriting was 7.5%.

Third Embodiment

Figure 9:
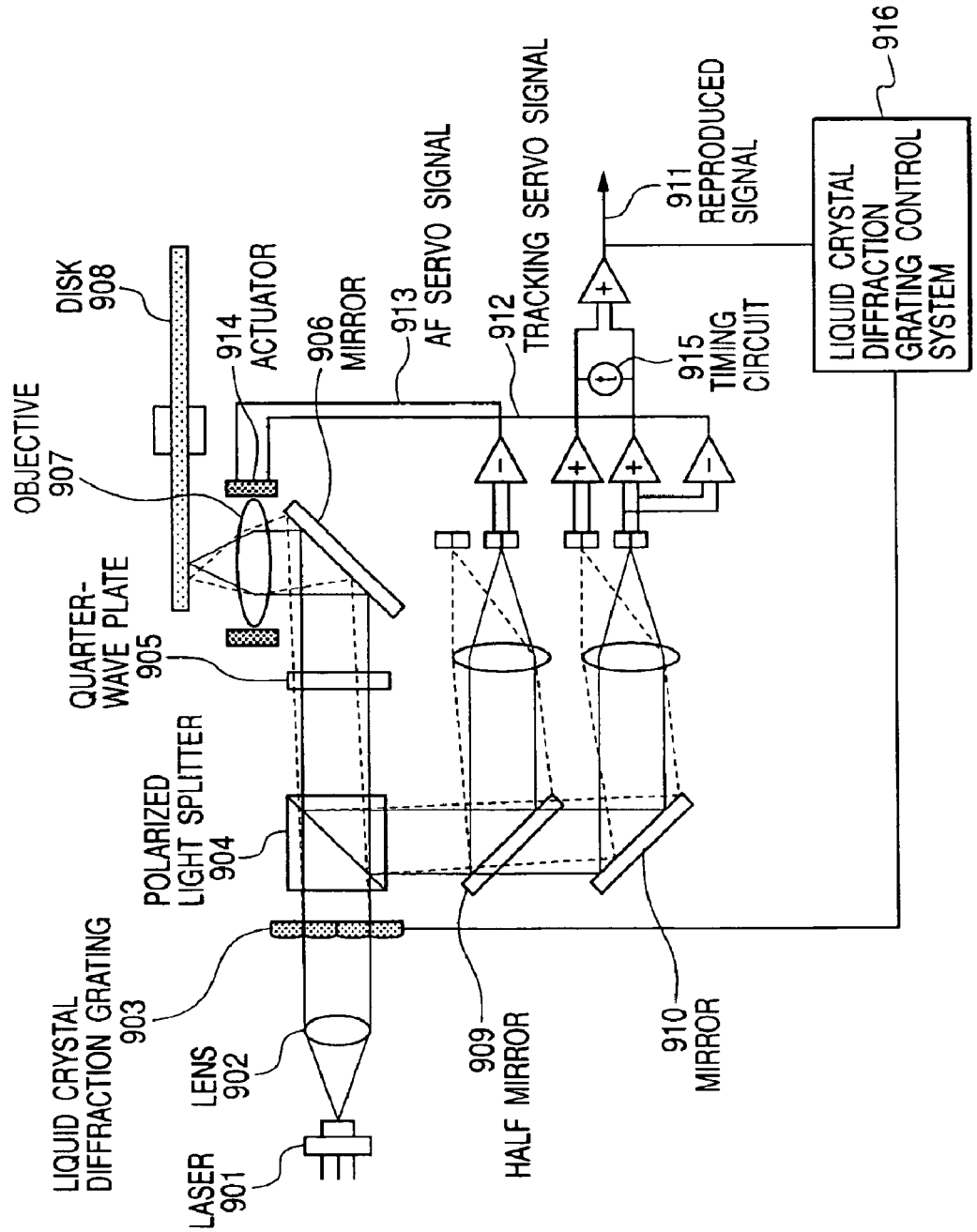
FIG. 9 is an explanatory diagram showing an optical head employed in a third embodiment of the present invention.

FIG. 9 is an explanatory diagram concerning a third embodiment of the present invention. A difference from the second embodiment lies in a point that both of two spots are used for reproduction. Voltages to be applied to the liquid crystal diffraction grating during recording and the power levels of laser light are determined in the same manner as those in the second embodiment. During reproduction, voltages to be applied to the liquid crystal diffraction grating are controlled in order to set the power division ratio between the two spots to 1:1.

The structure of an employed medium is the same as that employed in the second embodiment. However, grooves formed in order to create tracks on the medium are wobble grooves like the one described in, for example, Japanese Patent Laid-Open No. H10(1998)-091967. Herein, a clock is produced based on the cycle of a wobble groove, and timing is measured based on the clock and data signal. The timings of signals acquired from two spots are measured. A timing circuit 915 delays a signal, which is acquired from an erasing spot, according to the measured timings. The signals are then added up. Incidentally, the two signals are digitized before being added up, though it is not illustrated.

A mark was formed in order to record data under the conditions for recording employed in the second embodiment. Reproduction was performed, similarly to that in the first and second embodiments, at the linear velocity of 4.92 m/s. A jitter value measured during initial recording was 5.7%. The jitter value measured after ten times of overwriting was 5.2%, that measured after one hundred times of overwriting was 5.2%, that measured after one thousand times of overwriting was 5.4%, and that measured after five thousand times of overwriting was 6.3%.

Fourth Embodiment

Figure 10:
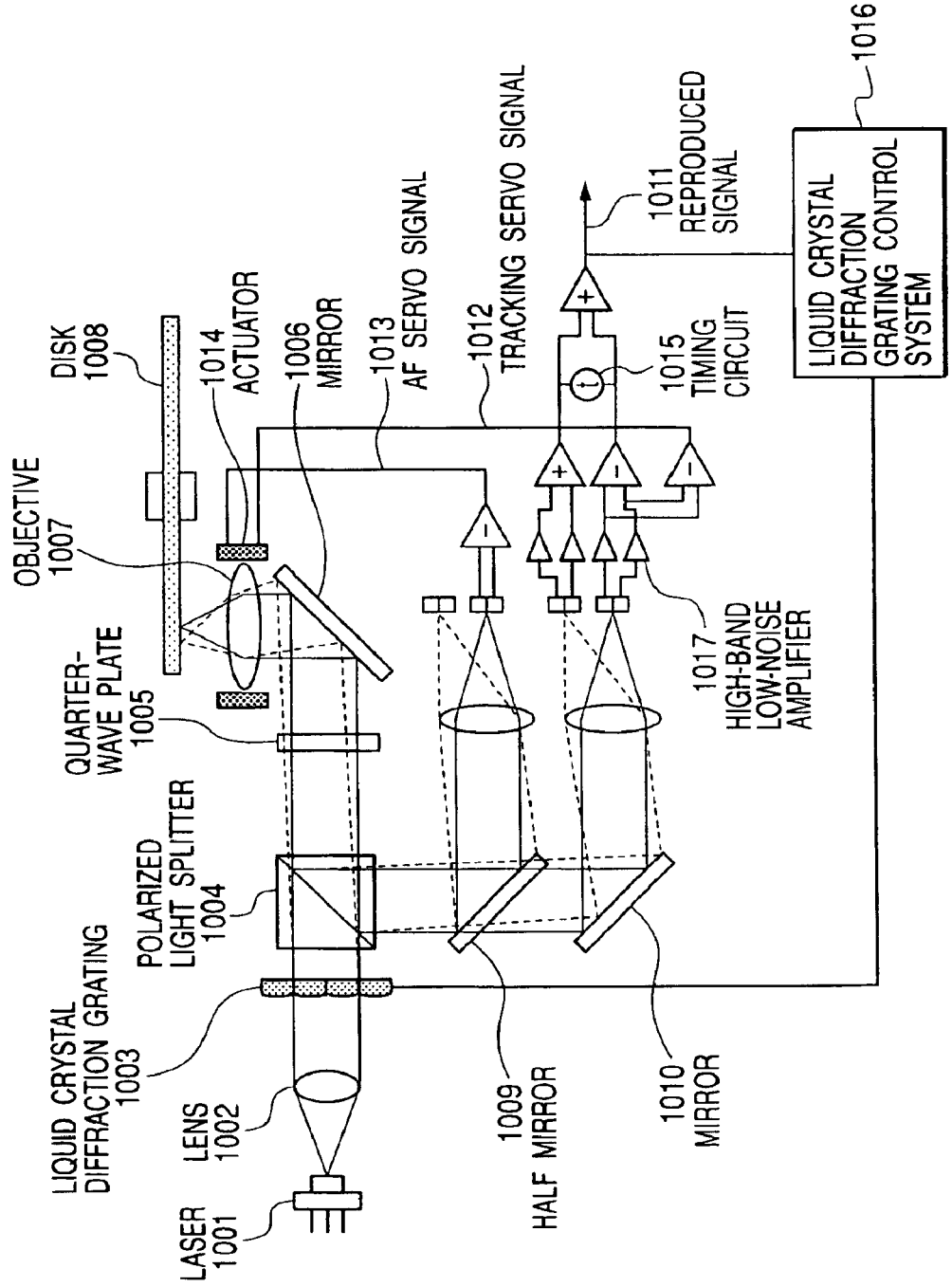
FIG. 10 is an explanatory diagram showing an optical head employed in a fourth embodiment of the present invention.

FIG. 10 is an explanatory diagram concerning a fourth embodiment of the present invention. A difference from the third embodiment lies in a point that a high-band low-noise amplifier 1017 is employed. The specifications for the amplifier are described in, for example, "Technical Digest of Optical Data Storage" disclosed at the Topical Meeting 2000 (PD8, 2000).

A disk and the conditions for recording were identical to those employed in the third embodiment. In the present embodiment, reproduction was, similarly to recording, performed at the linear velocity of 49.2 m/s. A jitter value measured during initial recording was 8.3%. The jitter value measured after ten times of overwriting was 7.6%, that measured after one hundred times of overwriting was 7.6%, that measured after one thousand times of overwriting was 8.0%, and that measured after five thousand times of overwriting was 9.2%. The measured jitter values are slightly larger than those measured in the second embodiment. This is because the linear velocity of the disk for reproduction is higher than that employed in the second embodiment. Consequently, since the frequency band of a reproduced signal is wider, high system noise is detected. However, since the present embodiment employs the low-noise amplifier, a rise in a jitter value deriving from an increase in the linear velocity of the disk is suppressed to the extent indicated with the above jitter values.

Moreover, the disk drive in accordance with the present embodiment was used to experimentally record or reproduce data on or from three disks that have the same structure as that shown in FIG. 7B and that have recording layers whose Sb contents are 70%, 73%, and 76% respectively. In this case, the linear velocities of the disks, of which Sb contents are 70%, 73%, and 76% respectively, for recording or reproduction were set to 12.5 m/s, 25 m/s, and 43 m/s respectively. Moreover, a recording pulse was a single pulse.

Figure 11:
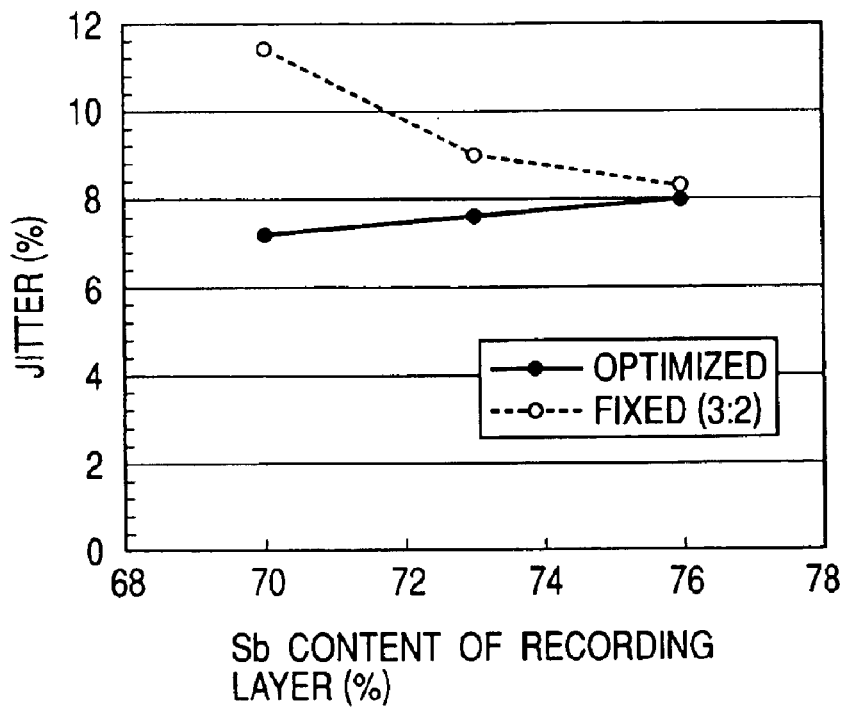
FIG. 11 indicates a jitter value detected after data on a disk that exhibits a different crystallization characteristic and is employed in the fourth embodiment of the present invention is overwritten 1000 times, wherein one curve indicates the jitter value detected in a case where a power division ratio between two light waves is optimized, and the other curve indicates the jitter value detected in a case where the power division ratio is fixed to 3:2.

A jitter value was measured after the disks were overwritten one thousand times. FIG. 11 indicates the results of the measurement. For comparison, the results of measurement performed with the power division ratio fixed to 3:2 are also indicated in FIG. 11. As seen from FIG. 11, when the power division ratio is optimized, a jitter value acceptable in practice is measured on the disks exhibiting different crystallization characteristics. Referring to FIG. 11, the larger the Sb content, the larger the jitter value. This is because since the linear velocity of the disk is made higher, high system noise is detected as mentioned above.

Fifth Embodiment

Figure 12:
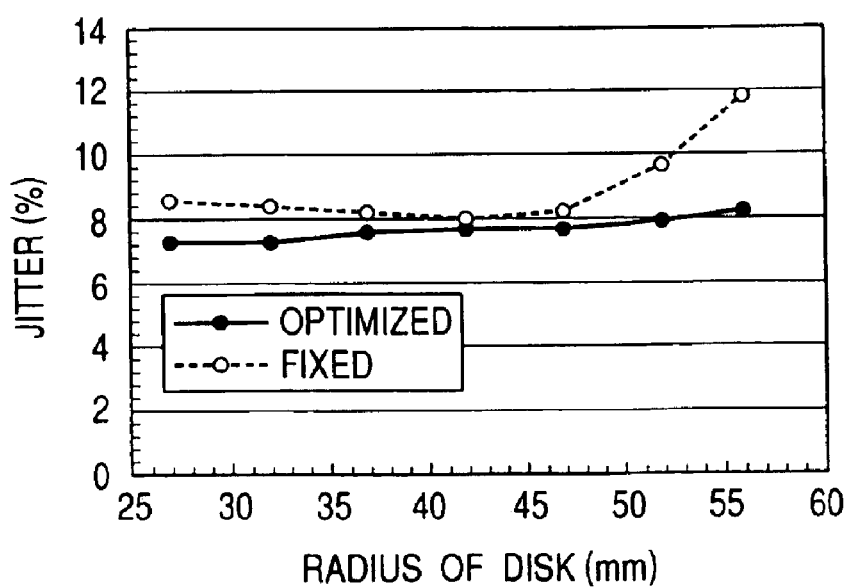
FIG. 12 indicates a jitter value, which is detected after data on a disk is overwritten 1000 times during constant-angular velocity (CAV) recording performed according to a fifth embodiment of the present invention, in relation to a radial position on a disk, wherein one curve indicates the jitter value detected in a case where a power division ratio is optimized, and the other curve indicates the jitter value detected in a case where the power division ratio is fixed to 3:2.

A system configuration and a disk employed in the fifth embodiment are identical to those employed in the fourth embodiment. However, recording was performed at different radial positions on a disk with the rotation frequency of the disk held constant. This way of recording is comparable to the constant-angular velocity (CAV) technique. Among the disks employed in relation to the fourth embodiment, the disk whose Sb content is 76% was adopted. The rotation frequency of the disk was set to 8000 rpm. The disk is divided into seven segments, that is, a segment ranging from 25 mm in radius to 30 mm in radius, a segment ranging from 30 mm in radius to 35 mm in radius, a segment ranging from 35 mm in radius to 40 mm in radius, a segment ranging from 40 mm in radius to 45 mm in radius, a segment ranging from 45 mm in radius to 50 mm in radius, a segment ranging from 50 mm in radius to 55 mm in radius, and a segment ranging from 55 mm in radius to 58 mm in radius. For each of the segments, a recording power level, a kind of recording pulse, and a power division ratio are optimized in the same manner as they are in the fourth embodiment. Namely, the disk drive in accordance with the fourth embodiment performs a recording test so as to discover an optimal recording power level, an optimal recording pulse, and an optimal power division ratio. In the first to fourth embodiments, the recording pulse is a single pulse. In this embodiment, for the purpose of suppressing recrystallization that occurs during recording on an inner segment in which the linear velocity of the disk is low, a multi-pulse is also adopted, and the disk drive optimizes the recording pulse. Consequently, for the segment ranging from 25 mm in radius to 30 mm in radius, a recording pulse whose recording power and bottom power are emitted during a time corresponding to 4 Tw was most suitable as described in relation to the related art. In the segments outside the radius of 30 mm, recording could be achieved with a single pulse. FIG. 12 indicates the results of measurement of a jitter value performed after data on the seven segments was overwritten one thousand times. In FIG. 12, one curve indicates the results of measurement with the power division ratio optimized for each segment, and the other curve indicates the results of measurement with the power division ratio fixed to 3:2. When the power division ratio is optimized for each segment, the jitter value is equal to or smaller than 8.2%. However, when the power division ratio is fixed to 3:2, the jitter caused by overwriting is worsened in the segments outside the radius of 50 mm. This is attributable to the fact that a previous recorded mark is not fully erased prior to overwriting. If data on the segments outside the radius of 50 mm is overwritten after a mark is fully erased, jitter of 80% or less occurs. For constant-angular velocity recording, it is necessary to optimize the power division ratio.

Sixth Embodiment

The configuration of a disk drive in accordance with a sixth embodiment of the present invention and the structure of a disk employed therein are identical to those employed in the fifth embodiment. However, the disk is not initialized, and a disk whose layer is left sputtered (as-deposited layer) is adopted. The as-deposited state is an amorphous state. During initial recording, the whole surface of the disk is amorphous. The disk is initialized with the preceding erasing spot. When the erasing spot passes, if the power level of the spot is a medium level causing the recording layer to be crystallized, crystallization is facilitated started with crystalline nuclei contained in the as-deposited layer. Part of the recording layer remains in the amorphous state, which other part thereof is crystallized. Moreover, if part of the recording layer is melted with the erasing spot, the perimeter of the melted part and a portion of the melted part that is cooled slowly after melted regions are crystallized. The other part is left amorphous. Consequently, the state of a disk that is not initialized but swept with the erasing spot is nearly identical to the state of an initialized disk that is swept with the erasing spot. Even if a disk is not initialized, the recording characteristic thereof is nearly identical to that of an initialized disk.

In the present embodiment, the conditions for recording or reproduction were identical to those employed in the fourth embodiment. A jitter value detected after data was initially recorded on a disk that was not initialized was 8.4%. Jitter values detected after completion of overwriting were identical to those detected in the fourth embodiment.

What is claimed is:

1. An information recording apparatus that irradiates light to an information recording medium, of which recording layer is formed with a phase change layer, so as to record information, comprising:
   a light source; and
   a dividing mechanism for dividing laser light, which is emitted from said light source and polarized in the same direction, into two light waves, wherein:
   said dividing mechanism includes a laser power ratio controller that controls a power ratio at which the laser light is divided;
   said two light waves have the first power that causes the temperature of said recording layer to be equal to or higher than the melting point, and the second power that causes the temperature of said recording layer to be equal to or higher than the temperature of atomic bond energy and fall below the melting point, respectively.

2. An information recording apparatus according to claim 1, wherein the two light waves are irradiated to the same track on said information recording medium, the preceding light is erasing light, and the succeeding light is recording light.

3. An information recording apparatus according to claim 1, wherein the power of the recording light is higher than the power of the erasing light.

4. An information recording apparatus according to claim 1, wherein: said dividing mechanism is realized with a diffraction grating; the distance between the two light waves is controlled based on the pitch between adjoining ones of grooves constituting said diffraction grating; and the power ratio between the two light waves is controlled based on the width of the grooves constituting said diffraction grating and the pitch between adjoining ones of the grooves.

5. An information recording apparatus according to claim 1, wherein said dividing mechanism is realized with a liquid crystal diffraction grating, and said laser power ratio controller adjusts voltages to be applied to said liquid crystal diffraction grating so as to control the power ratio.

6. An information recording apparatus according to claim 1, wherein the power ratio is determined based on the information recorded on said information recording medium or a condition of a minimum jitter value detected by performing a recording test.

7. An information recording apparatus according to claim 5, wherein the power ratio is determined for each of segments of said information recording medium defined with different radial positions on said information recording medium that is a disk.

8. An information recording/reproducing apparatus that irradiates light to an information recording medium, of which recording layer is formed with a phase change layer, so as to record or reproduce information, comprising:
   a light source;
   a dividing mechanism for diving laser light, which is emitted from said light source and polarized in the same direction, into two light waves, said dividing mechanism including a laser power ratio controller that controls a power ratio at which the laser light is divided, and the two light waves respectively assuming the first power that causes the temperature of said recording layer to be equal to or higher than the melting point, and the power that causes said recording layer to be crystallized;
   a photo-detector for detecting light waves reflected from said information recording medium to which the two light waves are irradiated; and
   a signal adding mechanism for converting the reflected light waves of the two light waves, which are detected by said photo-detector, into signals, and adding up the signals.

9. An information recording/reproducing apparatus according to claim 8, wherein for reproduction, the power ratio is set to 1:1.

* * * * *